Patented Mar. 20, 1934

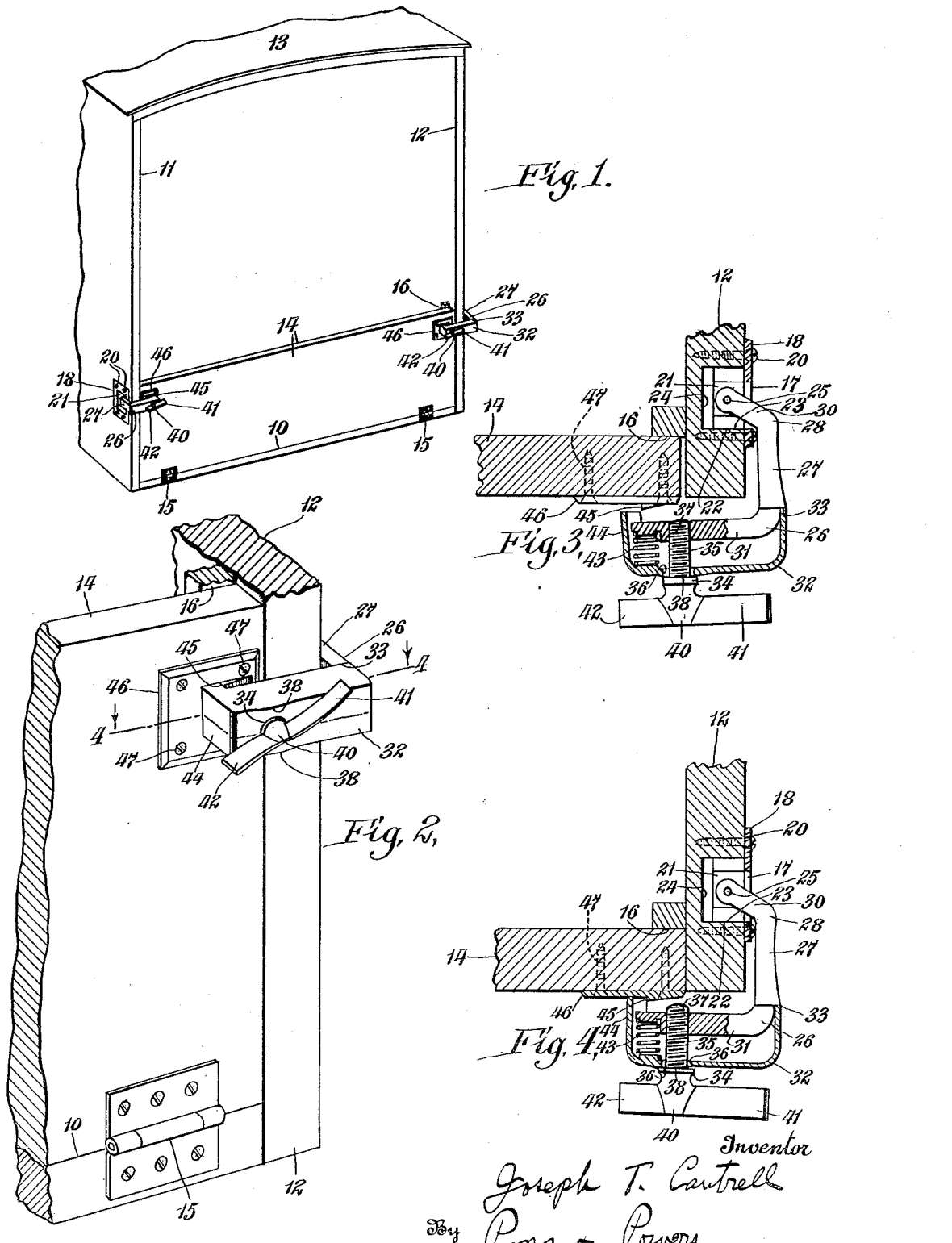

1,951,922

UNITED STATES PATENT OFFICE 1,951,922

CLAMP

Joseph T. Cantrell, Huntington, N. Y., assignor to J. T. Cantrell & Company, Huntington, N. Y., a firm composed of Joseph T. Cantrell, Albert B. Cantrell, and George W. Eulon Application April 3, 1931, Serial No. 527,373

9 Claims. (Cl. 292—256)

This invention relates more particularly to a clamp for fastening the flush, rear "tail board" or "gate" of an automobile truck to the side walls thereof.

The principal object of the invention is to both restrain said gate against longitudinal movement when clamped in place and to also clamp said gate laterally against the side walls of the truck body, so as to both laterally stiffen said side walls and also prevent longitudinal or lateral movement of said gate relatively to said side walls, which movement, if it did occur, would cause disagreeable noises. Another object of the invention is to provide a strong, durable and inexpensive clamp of this character which will not project out unduly far from the principal members of the truck body. A further object of the invention is to provide a clamp which is simple and foolproof in its manipulation and which is so enclosed as not to be interfered with by dirt and débris. Numerous other minor objects of the invention and practical solutions thereof are disclosed in detail in the herein patent specification wherein:—

In the accompanying drawing:

Fig. 1 is a diminutive, fragmentary perspective of the rear end of a conventional truck body having its tail board or gate secured in place by a pair of clamps constructed in accordance with the present invention.

Fig. 2 is a fragmentary perspective of one corner of said truck body showing one of the improved clamps in its clamped position.

Fig. 3 is a fragmentary, horizontal section through said clamp showing the same in its unclamped position.

Fig. 4 is a fragmentary, horizontal section through said clamp similar to Fig. 3 but showing said clamp in its locked position and taken on line 4—4, Fig. 2.

In the following description similar characters of reference indicate like parts in the several figures of the drawing.

My invention may be embodied in various forms and in clamps of different constructions and the present application is therefore to be regarded merely as one organization which satisfactorily carries out the invention in practice. As here shown the same is constructed as follows:

Fig. 1 illustrates the rear end of a conventional truck body which is assumed to be suitably mounted on a truck chassis and has a horizontal floor 10; vertical side walls 11 and 12 which may extend any desired distance above said floor; and, if desired, a curved horizontal roof 13. The rear end of the truck body is provided with a transverse door or end gate 14, which is pivotally connected by hinges 15—15 with the floor 10 of said truck body. Said end gate (in its closed position) is vertical and extends upwardly above said hinges 15—15, as illustrated in the drawing. Said end gate is restrained against further forward movement beyond its closed position (as illustrated) by the provision of a pair of suitable stop cleats 16 which are secured in any suitable manner to the side walls 11 and 12 of the truck body. As shown in this drawing, said end gate is so arranged with respect to the floor 10 and walls 11 and 12 of the truck body that, in its closed position, its vertical rear face is flush with both the rear edges of said floor and of said side walls. This constitutes a "flush" end gate for which the present invention is particularly adapted but is, at the same time, not necessarily confined.

The general object of the present invention is to detachably hold this end gate 14 in its raised or elevated position.

Arranged in the vertical outer face of each side wall 11 and 12 (adjacent its rear end and at a suitable distance above the floor 10) is a pivot socket 17 having an outer securing flange 18 which is held in place by suitable wood screws 20 or otherwise. The inner portion 21 of said socket is of rectangular shape, having its vertical rear face 22 abutting squarely against, and thereby firmly held by, the flat, lateral face 23 of the mortise 24 which receives said rectangular portion 21 of said pivot socket 17. This prevents any shearing strains from being imposed upon the wood screws 20 which hold said pivot socket in place,—all lateral movement of said pivot socket being restrained by the support of its vertical rear face 22 by said lateral face 24 of said mortise.

Pivotally connected with said pivot socket 17, upon a pivot 25, is an L or bell-crank-shaped clamping arm 26, the forward part 27 of which is normally disposed parallel to the adjacent side wall 12 of the truck body and is bent sharply inward at 28 to form the shoulder extension 30 which joins the main part of said clamping arm 26 to its pivot 25.

The rear end of said clamping arm 26 is bent sharply inward to form an integral forearm 31 which is almost completely encased within a channel shaped engaging jaw 32 that pivotally bears against the clamping arm 26 upon a pivot ledge 33 suitably formed on said clamping arm.

This ledge is preferably carried or extended around the upper and lower faces of said clamping arm so as to enable the upper and lower faces of said engaging jaw 32 to be flush with the upper and lower faces of the forward part 27 of said clamping arm 26. This arrangement enables the clamp to be neat in appearance as best shown in Fig. 2, and also prevents the operator or his clothing from being caught or injured by such projecting corners as would otherwise be formed at this point.

A tightening screw 34 is adapted to move said engaging jaw 32 toward said clamping arm 26. Said screw is provided at its rear end with a male threaded shank 35 which passes through a rather loose fitting aperture 36 which is formed medially at the inner end of the engaging jaw 32. The extreme rear end of said threaded shank 35 is threaded into a medial, tapped hole 37 suitably formed in the inner end of the forearm 31 of the clamping arm 26.

Adjacent the aperture 36 in the engaging jaw 32 is formed a semi-cylindrical or convex, pressure-centering protuberance 38 whose axis passes transversely through the center of said aperture. The tightening screw 34 is provided with a head 40 which bears against said protuberance 38. Projecting laterally from said head 40 is a handle, the one arm 41 of which extends out further and hence provides a greater torque leverage than the other arm 42 of said handle. Suitably arranged between the rear face and outer end of the forearm 31 of the clamping arm 26 and the adjacent vertical inner face of the "web" of the channel shaped engaging jaw 32 is a compression spring 43 which resiliently urges said clamping arm and engaging jaw apart.

The inner end of said engaging jaw 32 projects some distance forwardly beyond the main body thereof to form an engaging lip 44 which is adapted to engage with a vertical abutment 45 that is formed integrally upon the rear face of an abutment plate 46, the latter being secured to the rear face of the end gate 14 by means of wood screws 47 or otherwise.

*Operation*

After the truck end gate 14 has been swung upwardly upon its hinges 15—15 and against the stop cleats 16, the clamping arm 26 (with its engaging jaw 32, etc.) is swung in a clockwise direction into the position of Fig. 3. The arms 41 and 42 of the handle of the tightening screw 34 are then turned. This causes the engaging jaw 32 to be moved forward relatively to the clamping arm 26 and against the resistance of the compression spring 43. This movement of said engaging jaw 32 continues until the front face of the engaging lip 44 thereof comes into contact with the rear face of the abutment plate 46. During the foregoing operation no movement of the clamping arm 26 has occurred, but further rotation of said tightening screw 34 causes a rotary movement of said clamping arm in a counter clockwise direction about its pivot 25 and this causes a corresponding outward movement of the pivot ledge 33. The latter carries with it the engaging jaw 32 in an also outward direction until the engaging lip 44 of said engaging jaw 32 comes in contact with the abutment 45 of said clamping plate 46. Continued rotation of the tightening screw 34 now causes the side wall 12 of the truck body to be moved laterally until it is in firm contact with the vertical edge of the gate 14, and, at the same time, pushes said gate forwardly into firm contact with the stop cleat 16 of said side wall 12 in case said end gate is warped or otherwise is disinclined to properly and firmly rest against said stop cleat in the absence of a positive force compelling it so to do. This lateral, forceful movement of the side wall 12 relatively to the end gate 14 and also the forward forceful movement of said gate against the stop cleat 16 is caused by the forceful approach toward each other of the engaging lip 44 and the pivot 25.

The end gate 14 is now tightly clamped to the side wall 12 so that any movement of the two relatively to each other is now prevented. This enables said end gate to function (when in its closed position, as per Figs. 1, 2 and 4) as a very effective brace for the two side walls 11 and 12, not only by bracing or buttressing each side wall individually to the tail board but also tying together or securing said side walls laterally to each other. Said end gate is also, in this position, held in firm contact with the stop cleats 16. Thus the end gate is prevented from moving relatively to both said cleats and to said side walls, so that noisy slapping of these parts against each other is prevented.

The clamp is prevented from loosening by two factors:—(1) The one arm 41 of the handle of the tightening screw 34 is longer than the other arm 42 thereof and is disposed outwardly, as shown in the drawing when the clamp is locked, thereby tending to cause clockwise rotation of said tightening screw and thus constituting a force which opposes the loosening of said screw, and (2) The compression spring 43 acts in opposition to the tightening screw and thereby operates in the capacity of a lock nut to prevent loosening of said screw.

When the operator desires to open the end gate 14, he merely turns the tightening screw 34 in a counter clockwise direction (see Fig. 3) and throws the whole clamping arm 26 back and out about its pivot 25. In this position the various parts which are mounted on said clamping arm are prevented from rattling relatively to each other by reason of aforesaid compression spring 43. Said compression spring also resiliently pushes the engaging jaw 32 outwardly against the head 40 of the tightening screw 34. This facilitates the manipulation of the clamp by virtue of the fact that the engaging lip 44 of said engaging jaw is at all times resiliently pushed as far away from the abutment 45 as is permitted by the actual position of the tightening screw 34. In other words, the position of said engaging lip 44 depends solely upon the position of said tightening screw, as far as the position of both of these parts relatively to the clamping arm 26 is concerned.

It is desirable that the pressure of the engaging jaw 32 against the head 40 of the engaging screw 34 be coaxial with respect to the threaded shank 35, so as to prevent undue binding and uneven wear of said threaded shank in its tapped hole 37. This condition is affected by the provision of the pressure-centering abutment 38, the axis of which is vertical and intersects the axis of the threaded shank 35, so that the line of contact between the engaging jaw 32 and the head 40 of the tightening screw 34 always intersects the axis of the threaded shank 35 of said tightening screw.

Dirt and débris is prevented from dropping into and becoming wedged in the spaces between the various working parts of the clamps by reason of the semi-hollow or channel shape of the engaging jaw 32 which completely encases the most vulnerable parts of the clamp except at its front side and this side is very effectively sealed by the forearm 31 of the clamping arm 26.

I claim as my invention:

1. A clamp adapted to fasten together two relatively movable members and comprising a clamping arm pivoted to one of said members; an abutment secured to the other member inwardly of the pivot of said clamping arm; an engaging jaw; means for moving said jaw toward said arm; and resilient means for pressing said jaw away from said arm.

2. A clamp adapted to fasten together two relatively movable members and comprising a clamping arm pivoted to one of said members; an abutment secured to the other member inwardly of the pivot of said clamping arm; a channel shaped engaging jaw covering the outer end of said clamping arm and adapted to bear against said abutment; and means for moving said jaw toward the pivot of said clamping arm.

3. A clamp adapted to fasten together two relatively movable members and comprising a clamping arm pivoted to one of said members; an abutment secured to the other member inwardly of the pivot of said clamping arm; a channel shaped engaging jaw covering the outer end of said clamping arm and adapted to bear against said abutment; a spring arranged within the hollow part of said jaw and urging apart said jaw and clamping arm; and means for moving said jaw toward said clamping arm.

4. A clamp adapted to fasten together two relatively movable members and comprising a clamping arm pivoted to one of said members; an abutment secured to the other member inwardly of the pivot of said clamping arm; a channel shaped engaging jaw covering the outer end of said clamping arm and adapted to bear against said abutment; and a tightening screw adapted to clamp said jaw to said clamping arm and having its shank disposed within the hollow part of said jaw.

5. A clamp adapted to fasten together two relatively movable members and comprising a clamping arm pivoted to one of said members; an abutment secured to the other member inwardly of the pivot of said arm; an engaging jaw having a medial aperture; and a tightening screw provided with a head and a threaded shank and having its head disposed outside of said jaw and having its shank passing through said aperture and threaded into said clamping arm.

6. A clamp adapted to fasten together two relatively movable members and comprising a clamping arm pivoted to one of said members; an abutment secured to the other member inwardly of the pivot of said arm; an engaging jaw having a pressure-centering protuberance; and a tightening screw provided with a head and a threaded shank and having its head disposed against said protuberance and having its shank threaded into said clamping arm.

7. A clamp adapted to fasten together two relatively movable members and comprising a clamping arm pivoted to one of said members; an abutment secured to the other member inwardly of the pivot of said arm; an engaging jaw having a medial aperture and having a pressure-centering protuberance whose axis passes transversely through the center of said aperture; and a tightening screw provided with a head and a threaded shank and having its head disposed against said protuberance and having its shank passing through said aperture and threaded into said clamping arm.

8. A clamp adapted to fasten together two relatively movable members and comprising an abutment secured to one of said members; an engaging lip pivotally connected to the other of said members at a point inwardly of said abutment; and means for moving said lip toward said pivot, whereby the one of said movable members is moved forwardly and also the other of said members is moved inwardly.

9. A clamp adapted to fasten together two relatively movable members and comprising an abutment secured to one of said members; a stop adapted to prevent forward movement of the one member relatively to the other member; a clamping arm pivoted to one of said members inwardly of said abutment, and an engaging jaw arranged on said clamping arm and engageable with said abutment and adapted to move said abutment toward the pivot of said clamping arm, whereby the one of said movable members is moved forwardly against said stop and also the member carrying the stop is moved inwardly.

JOSEPH T. CANTRELL.